United States Patent [19]

Nakayama

[11] 4,258,691
[45] Mar. 31, 1981

[54] PNEUMATIC TIRE HAVING AN IMPROVED UNEVEN WEAR RESISTANCE

[75] Inventor: Osamu Nakayama, Mitaka, Japan

[73] Assignee: Bridgestone Tire Company Limited, Tokyo, Japan

[21] Appl. No.: 45,465

[22] Filed: Jun. 4, 1979

Related U.S. Application Data

[63] Continuation of Ser. No. 798,548, May 19, 1977, abandoned.

[30] Foreign Application Priority Data

May 19, 1976 [JP] Japan ................................. 51/56628

[51] Int. Cl.³ ............................................. B60C 11/04
[52] U.S. Cl. .................................................. 152/209 R
[58] Field of Search ............ 152/209 R, 209 B, 209 D

[56] References Cited
U.S. PATENT DOCUMENTS

| | | | |
|---|---|---|---|
| 2,962,072 | 11/1960 | Skidmore | 152/209 R |
| 3,068,926 | 12/1962 | Jacob et al. | 152/35 X |
| 3,362,376 | 1/1968 | Norton | 152/209 R |
| 3,707,177 | 12/1972 | Boileau | 152/209 R |
| 3,951,193 | 4/1976 | Yeager | 152/209 R |
| 4,040,464 | 8/1977 | Skidmore | 152/209 R |

FOREIGN PATENT DOCUMENTS

2317112  7/1975  France ........................................ 152/209

*Primary Examiner*—Michael W. Ball
*Attorney, Agent, or Firm*—Sughrue, Rothwell, Mion, Zinn and Macpeak

[57] ABSTRACT

A pneumatic tire having tread grooves and tread-ground contact areas separated from each other by the grooves is disclosed. The tread-ground contact area has an outwardly projected edge and is faced towards the tread grooves. That part of said outwardly projected edge which is located nearest the crown center of the tire has at its tip a minimum rubber thickness, thinner than a standard rubber thickness of the tread-ground contact area with the rubber thickness gradually decreasing towards the tip of the outwardly projecting edge. The tire has an improved uneven wear resistance, resulting in greater comfort, reduced vibration and noise and improved durability.

6 Claims, 22 Drawing Figures

FIG_1a
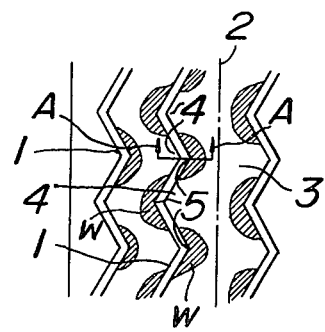
FIG_1b
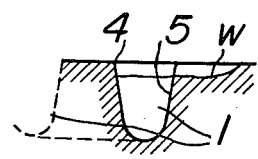
FIG_2a
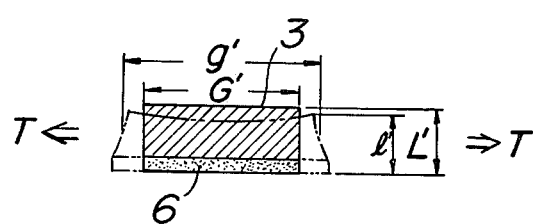
FIG_2c
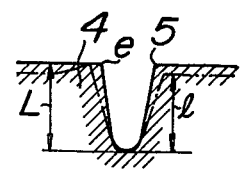
FIG_2b
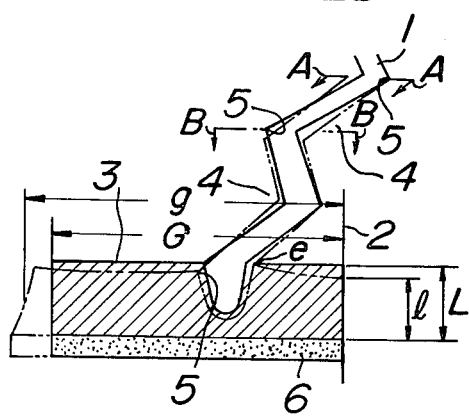
FIG_2d
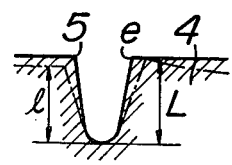

PNEUMATIC TIRE HAVING AN IMPROVED UNEVEN WEAR RESISTANCE

BACKGROUND OF THE INVENTION

This is a continuation of application Ser. No. 798,548, filed May 19, 1977 now abandoned.

The present invention relates to a pneumatic tire which has improved uneven wear resistance.

In pneumatic tires, particularly in large size pneumatic tires having a bias-structured carcass ply, the tread portion is generally made of thick rubber and has deep tread grooves. In these tires, uneven wear often occurs on the surface of tread-ground contact areas separated from each other by the tread grooves. This uneven wear causes uncomfortable vibration and noise, and lowers the durability and life of the tire.

Such "uneven wear" is a local wear problem started from the vicinity of inwardly recessed edges of tread-ground contact areas, which are separated from each other by the tread grooves and occurs without wearing outwardly projected edges of the tread-ground contact areas either when a pneumatic tire runs on a relatively smooth paved road or non-paved road under a normal running condition.

BRIEF DESCRIPTION OF THE DRAWINGS

For a better understanding of the invention, reference is taken to the accompanying drawings, wherein:

FIGS. 1a and 1b are diagrammatic views for illustrating the occurrence of local wear in a rib-type tread pattern tire as occurs in tires of the prior art;

FIGS. 2a-2d are diagrammatic views for illustrating the deformation of tread due to inflation of a tire by applying internal pressure;

FIG. 3b is a plan view of the tire tread shown in FIG. 3a;

DESCRIPTION OF THE PREFERRED EMBODIMENTS

Figure 3A:
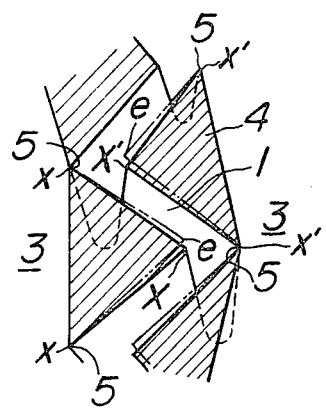
FIG. 3a is a diagrammatic view of appearance of the tire tread for illustrating the application of the present invention.

An example showing how local wear occurs in a tire of the prior art will be explained with reference to a rib-type tread pattern tire as shown in FIGS. 1a and 1b. In FIG. 1a, the numeral 1 represents tread grooves, 2: crown center, 3: tread-groove contact area (shown in this example as a zigzag rib), 4: outwardly projected edge of the zigzag rib, and 5: inwardly recessed edge thereof. The local wear w is shown by a shaded line portion in FIG. 1a. FIG. 1b is the cross-sectional view in an enlarged scale of the local wear shown in FIG. 1a.

The local wear w occurs discontinuously in the form of a wave along the circumferential direction of a tire causing vibration and noise to be developed by the running of the tire.

Such uneven wear occurs due to the following reason. In a large size tire as used mainly for trucks and buses, the tread rubber is thick and the tread groove is deep. Moreover, in the large size tire provided with a bias-structured carcass ply in order to maintain a comfortable ride, nylon cords frequently used in the carcass ply are easily stretched, and air pressure applied to the tire is generally high. Therefore, the tread is deformed by the high internal pressure to form undulations in the tread of the tire.

This deformation will be explained hereinafter referring to FIGS. 2a-2d. FIG. 2a is a partial cross-sectional view, in enlarged scale, of tread-ground contact area 3. FIG. 2b is a diagrammatic view illustrating the appearance of an essential part of the crown at one side of the crown center 2 before an internal pressure is applied to the tire, and an imaginary deformation due to the inflation of the tire by the application of internal pressure. FIGS. 2c and 2d are cross-sections taken on lines A—A and B—B of FIG. 2b, respectively.

In FIG. 2a, the tread-ground contact area 3 is elongated from the original dimension G' at the mold to the dimension g' by a tension T caused by a high internal pressure applied in the tire, and the total uninflated thickness L' of the tread and carcass reduces to thickness l' upon inflation. The above described dimension g' represents an average elongation of the tread-ground contact area 3 in both the inner and outer surfaces of the tire.

As illustrated in FIGS. 2b, 2c and 2d, the tread-ground contact areas 3 are separated from each other by the tread groove 1, and the thickness of rubber in the adjacent tread-ground contact areas 3 is not uniformly reduced.

This thickness difference may be explained as follows. As seen from FIGS. 2b, 2c and 2d, the rubber at an inwardly recessed edge 5 is pulled and the thickness of the rubber at the edge 5 is made smaller by (L−l) than that of rubber at the tip e of an outwardly projected edge 4 in the tread-ground contact area.

The inventors have found that such thickness difference enhances the pressure subjected on the ground contact surface of the outwardly projected edge 4 at a portion near the crown center 2 in a tread-ground contact area during the running of the tire. The pressure subjected on the ground contact surface at a portion other than the outwardly projected edge 4 in the tread-ground contact area, particularly the pressure on an inwardly recessed edge 5 at which the thickness of rubber is noticeably decreased is lower than that of the edge 4, and hence the rubber at the edge 5 slips and moves more easily on the road surface than the rubber near the edge 4, at which the ground contact pressure is higher than that at the edge 5. This slipping movement repeatedly occurs in every rotation of the tire thereby causing local wear beginning from the inwardly recessed edge 5 in the tread-ground contact area 3.

The present invention has an object to make uniform the pressure subjected to the ground contact surface by eliminating the thickness difference in order to prevent the above described local wear.

In general, the thickness difference (L−l) is influenced by the tread pattern and other factors, because the elongation of carcass 6 can be considered to be substantially uniform. After various experiments with respect to combinations of commonly known factors in the design of ordinary tires, the inventors have found that the thickness difference can be represented by the following experimental formula:

$$l/L = 1 - \left(\frac{1}{m} \cdot \frac{g-G}{G}\right) \cdot K \qquad (1)$$

In the formula,
1/m: Poison's ratio
L: Tread rubber thickness of a tire in a vulcanizing oven.
l: Tread rubber thickness after the tire is inflated by applying an internal pressure.
G: Distance of a mark from the crown center of the tire in a vulcanizing oven.
g: Distance of the mark from the crown center after the tire is inflated.
K: Coefficient determined by the basic pattern, the structure and material of carcass, the strength of breaking and the normal air pressure of the tire.

Local wear w is produced corresponding to the thickness difference (L−l) given by the formula (1). In the present invention, based on the above recognition, in order to eliminate the cause of such local wear, an outwardly projected edge 4' facing the tread groove 1 as shown in FIGS. 3a-d is formed such that the edge 4' has a smallest rubber thickness at the tip e, which is smaller than a standard rubber thickness in the tread-groove contact areas located near the crown center or all over the crown of the tire, and with the rubber thickness is decreased gradually towards the tip e of the outwardly projected edge. The use of such measures effectively prevents the outwardly projected edge 4 from being exposed to a high pressure subjected to the ground contact surface, which is considerably higher than that in the other portion of the tread-ground contact area. The tread-ground contact area is caused to make contact with road surface in a uniform manner. As a result, it is possible to decrease the local wear w, which is started from the vicinity of the inwardly recessed edge 5 of the tread-ground contact area 3 due to the slipping movement relative to road surface of the area 3 that tends to rise from the road surface.

The above described measures of the present invention will be explained in more detail referring to FIGS. 3a-3d. FIG. 3a is a view illustrating the appearance of an uninflated tire.

In the present invention, as the appearance of an uninflated tire as it emerges from the mold is illustrated in FIG. 3a. The surfaces of outwardly projected edges 4 face a tread groove 1 and are formed in zigzag ribs 3, arranged on both sides of the tread groove 1 which are cut down towards the tips e of the edges 4 as shown by broken lines in FIG. 3a. That is, the thickness of tread rubber of zigzag ribs 3, which is shown by a dashed line, is gradually decreased from the inwardly recessed edges X to the tips X' of the outwardly projected edges 4.

Figure 3B:
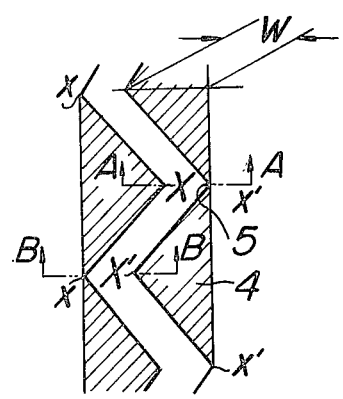
Figure 3C:
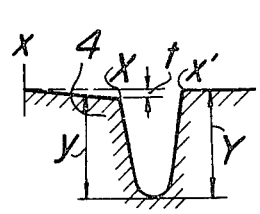
FIGS. 3c and 3d are cross-sectional views of the tire tread shown in FIG. 3a taken on the lines A—A and B—B, respectively.
Figure 3D:
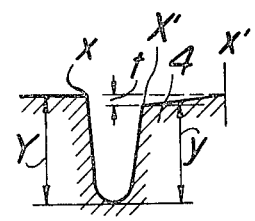

FIG. 3b is a plan view of the ribs 3 arranged on both sides of the tread grooves 1. FIGS. 3c and 3d are cross-sections taken on lines A—A and B—B of FIG. 3b, respectively. As illustrated in FIGS. 3c and 3d, the thickness y of tread rubber at the tips X' of the outwardly projected edges 4 of the ribs 3 is made into a thickness smaller than the standard thickness Y of tread rubber by Y−y=t.

The reduced thickness t is calculated by the formula (1) such that, when a tire is inflated by applying a standard internal pressure, the tread is deformed and the outwardly projected edge 4 can form a smooth single curved surface together with the inwardly recessed edge 5. The reduced thickness t is generally about 0.5-2.0 mm.

The gradually decreasing area of the rubber thickness shown by broken lines in FIGS. 3a and 3b, is made into 20-100% based on the distance W from the straight line connecting the adjacent bent points X and X' i.e., from the straight line connecting the inwardly recessed edges 5 and 5 to the tip X' of the outwardly projected edge 4 in the tread-ground contact area 3. When this area is within the above described range, the uneven wear can be effectively prevented without reducing the function of the tread groove.

When the area is less than 20%, the effect for preventing the uneven wear is insufficient. While, when the area exceeds 100%, undulations are not formed on the crown of tread, and therefore the edge effect of the tread groove is poor and the wet resistance of the tread on the road surface is deteriorated.

FIGS. 4a-4e show a 10.00-20 size tire provided with a zigzag rib-type tread pattern, according to the present invention.

This tire has two zigzag tread grooves 1 respectively on both sides of a crown center 2. The groove has a zigzag pitch P of about 60 mm, and the zigzag is inclined at an angle of about 25° with respect to the circumferential direction of the tire.

Figure 4A:
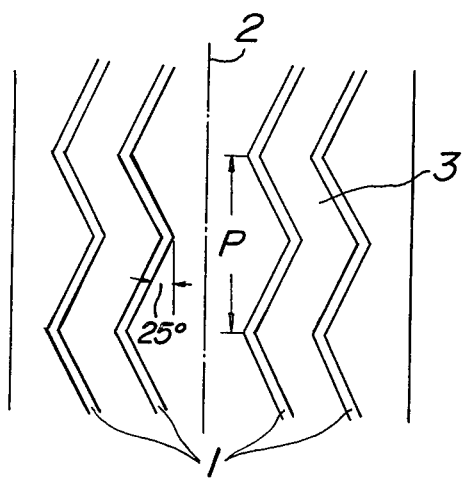
FIGS. 4a-4e are diagrammatic views for illustrating the application of the present invention to a rib type pattern.
Figure 4B:
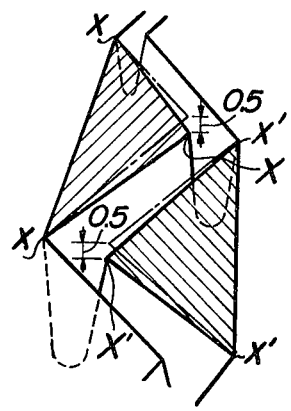
Figure 4C:
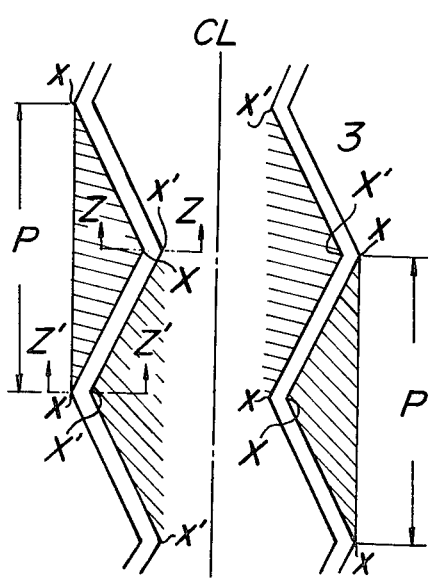
Figure 4D:
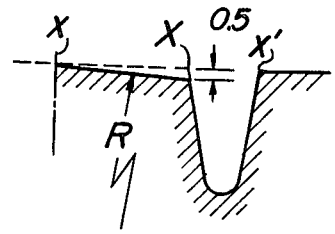
Figure 4E:
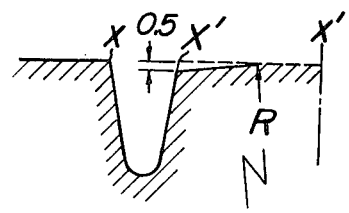

As illustrated in FIGS. 4b-4d, the thickness of tread rubber in the tread-ground contact area 3 is gradually decreased from bent points X of tread groove 1 to a tip X of the edge 4 or from bent points X of the groove 1 to a tip X' of the edge 4 at a radius R of curvature of 150 mm such that the thickness of the tread rubber at the tips X' is smaller by 0.5 mm than the standard thickness of the zigzag rib, that is, the standard thickness of the tread-ground contact area 3.

In the above described rib-type tread pattern tire, substantially uniform pressure is subjected to the ground contact surface of each tread-ground contact area, and it has been ascertained in road test that uneven wear does not occur until about 50,000 km running and the tread was worn uniformly.

Figure 5A:
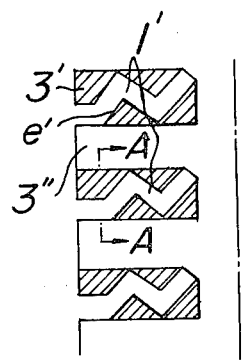
FIGS. 5a and 5b are diagrammatic view for illustrating the application of the present invention to lug type pattern.
Figure 5B:
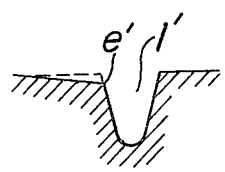
Figure 6A:
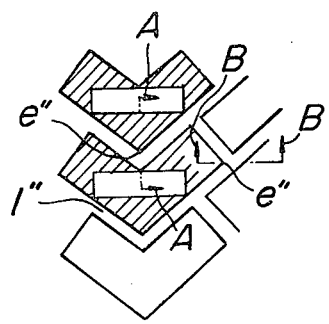
FIGS. 6a-6c are diagrammatic view for illustrating the application of the present invention to block type pattern.
Figure 6B:
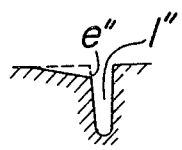
Figure 6C:
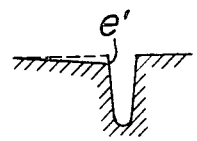

The present invention can be applied not only to the above described rib-type tread pattern tire, but also to the lug-type tread pattern tire and block-type tread pattern tire. In the lug-type tread pattern tire, since a heel and toe wear is apt to occur in lugs 3 and 3' separated from each other along the circumferential direction of the tire, the thickness of the tread rubber is made smallest at the tip e' of outwardly projected edges and is gradually increased towards the center of the lug from the tip e' as illustrated in FIGS. 5a and 5b. In the block-type tread pattern tire, the thickness of tread rubber at the tip e'' of outwardly projected edges of each block is made thin as illustrated in FIGS. 6a, 6b and 6c.

Figure 7A:
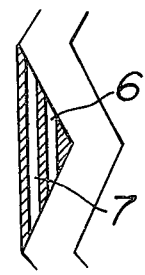
FIGS. 7a and 7b are diagrammatic views for illustrating an alternate embodiment of the present invention.
Figure 7B:
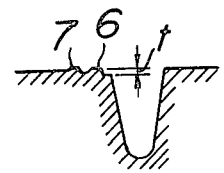

In the present invention, a tread-ground contact area, wherein the rubber thickness is gradually increased, may be provided with one or more of ribs, for example, ribs 6 and 7, as illustrated in FIGS. 7a and 7b.

According to the present invention, undulations due to the local wear in the crown of tread portion are remarkably decreased, so that replacement of the tire is not necessary for a long running time and consequently that labors required for the maintenance of the tire can be remarkably saved.

What is claimed is:

1. A pneumatic tire having improved uneven wear resistance comprising a plurality of tread grooves and tread-ground contact areas separated from each other by said tread grooves, said tread-ground contact area having an outwardly projected edge projecting from an inward edge and facing towards the tread grooves, that part of said outwardly projected edge which is located nearest the crown center of the tire having a rubber thickness gradually decreasing towards the tip of said edge when the tire is uninflated, and said rubber thickness being substantially constant when said tire is inflated with standard pressure.

2. A pneumatic tire having an improved uneven wear resistance according to claim 1, wherein the rubber thickness at the tip of the outwardly projected edge is thinner than the rubber thickness at said inward edge by 0.5–2.0 mm.

3. A pneumatic tire having an improved uneven wear resistance according to claim 1, wherein the tire has a bias-structured carcass ply.

4. A pneumatic tire having an improved uneven wear resistance according to claim 1, wherein all of the outwardly projected edges of tread-rubber contact areas have a rubber thickness which decreases gradually towards the tip thereof.

5. A pneumatic tire having an improved uneven wear resistance according to claim 1, wherein the tread grooves are arranged in a continuous zigzag form along the circumferential direction of the tire.

6. A pneumatic tire having an improved uneven wear resistance according to claim 5, wherein the thickness of tread rubber of the outwardly projected edge in the tread-ground contact area is gradually decreased, when the tire is uninflated, starting from a position, which does not extend beyond a straight line connecting adjacent bent points extending in the same direction in the zigzag tread groove.

* * * * *